(12) United States Patent
Fellows

(10) Patent No.: US 7,388,670 B2
(45) Date of Patent: Jun. 17, 2008

(54) LASER GYRO READOUT SIGNAL STABILIZATION IN HIGH VIBRATION ENVIRONMENTS

(75) Inventor: David O. Fellows, Largo, FL (US)

(73) Assignee: Honeywell International Inc., Morristown, NJ (US)

( * ) Notice: Subject to any disclaimer, the term of this patent is extended or adjusted under 35 U.S.C. 154(b) by 188 days.

(21) Appl. No.: 11/294,284

(22) Filed: Dec. 5, 2005

(65) Prior Publication Data

US 2008/0117426 A1    May 22, 2008

(51) Int. Cl.
*G01C 19/66* (2006.01)
(52) U.S. Cl. ........................... 356/459; 356/472
(58) Field of Classification Search .......... 356/459, 356/472, 473
See application file for complete search history.

(56) References Cited

U.S. PATENT DOCUMENTS 3,612,690 A * 10/1971 Staats .................. 356/476
4,284,964 A * 8/1981 Maier, Jr. .............. 356/473
5,088,824 A * 2/1992 Killpatrick et al. ....... 356/459
5,489,981 A * 2/1996 Killpatrick et al. ....... 356/459

* cited by examiner

*Primary Examiner*—Samuel A Turner
(74) *Attorney, Agent, or Firm*—Fogg & Powers LLC

(57) ABSTRACT

A method of stabilizing beam power in a ring LASER gyroscope (RKG) during high vibration is provided. The method comprises modifying an electrical signal output from an RLG photodetector to generate a direct current (DC) feedback signal, the DC levels of the feedback signal being proportional to RLG beam power. The method further comprises comparing the DC levels of the feedback signal to a DC reference signal, wherein the DC levels of the reference signal are proportional to a desired RLG beam power level. The method also comprises generating a difference signal representing a difference signal representing a difference between the DC levels of the reference signal and the feedback signal and adjusting RLG beam power based on the difference signal.

21 Claims, 3 Drawing Sheets

US 7,388,670 B2

LASER GYRO READOUT SIGNAL STABILIZATION IN HIGH VIBRATION ENVIRONMENTS

TECHNICAL FIELD

The present invention generally relates to ring LASER gyroscopes and, in particular, to power stabilized ring LASER gyroscopes.

BACKGROUND

Ring LASER gyroscopes (RLG) have various advantages over mechanical gyroscopes. For example, in an RLG there are typically no moving parts which helps eliminate friction and, consequently, inherent drift terms. Additionally, the zero mass light beams in the RLG are not affected by acceleration forces unlike the physical parts in mechanical gyroscopes.

However, the structure of the RLG includes glass and mirrors which have mass and are affected by acceleration forces. When the acceleration forces are sufficiently strong, such as during periods of high vibration, the acceleration forces can cause flexure in the structure of the RLG. If the glass flexes sufficiently, the glass structure can interfere with the light beams in the RLG causing noise to be introduced into the signals used to create precision outputs from the RLG. This is the result of the beam power being modulated by the interference.

For the reasons stated above, and for other reasons stated below which will become apparent to those skilled in the art upon reading and understanding the present specification, there is a need in the art for a self-stabilizing RLG that stabilizes the light beam power in the RLG.

SUMMARY

The above-mentioned problems and other problems are resolved by the present invention and will be understood by reading and studying the following specification In one embodiment, a method of stabilizing beam power in a ring LASER gyroscope (RLG) during high vibration is provided. The method comprises modifying an electrical signal output from an RLG photodetector to generate a direct current (DC) feedback signal, the DC levels of the feedback signal being proportional to RLG beam power. The method further comprises comparing the DC levels of the feedback signal to a DC reference signal, wherein the DC levels of the reference signal are proportional to a desired RLG beam power level. The method also comprises generating a difference signal representing a difference between the DC levels of the reference signal and the feedback signal and adjusting RLG beam power based on the difference signal.

In another embodiment, a self-stabilizing ring LASER gyroscope (RLG) is provided. The self-stabilizing RLG comprises a photodetector for detecting light signals from the RLG and generating an electrical RLG output signal based on the light signals detected, and a power detector for receiving the electrical signal generated by the photodetector and generating a feedback signal based on the electrical signal, wherein the feedback signal is proportional to RLG beam power. The self-stabilizing RLG also comprises a stabilization circuit coupled to the power detector and RLG, the stabilization circuit being adapted to alter the RLG beam power based on the feedback signal.

In yet another embodiment, a self-stabilizing ring LASER gyroscope (RLG) is provided. The self-stabilizing RLG comprises means for generating a feedback signal the feedback signal being proportional to RLG beam power, means for comparing the feedback signal to a reference signal, means for generating a difference signal representing the difference between the feedback signal and the reference signal, wherein the reference signal is proportional to a desired RLG beam power level, and means for adjusting RLG beam power based on the difference signal.

In yet another embodiment, a computer readable medium having computer-executable instructions for performing a method of generating a signal to stabilize beam power output of a ring LASER gyroscope (RLG) is provided. The method comprises receiving a digital signal, the DC level of the digital signal being proportional to RLG beam power, calculating a difference in the DC level of the digital signal and a reference DC value, the reference value being proportional to a desired RLG beam power, generating a correction signal for driving changes in RLG beam power, the correction signal being based on the calculated difference, and outputting the correction signal to a digital to analog converter to convert the correction signal to an analog signal for transmission to the RLG.

In yet another embodiment, an inertial reference system is provided. The inertial reference system comprises a ring LASER gyroscope (RLG) having a plurality of mirrors, LASERS and a photodetector for detecting changes in rotation and outputting an electrical signal representative of changes in rotation. The inertial reference system also comprises a power detector coupled to the RLG, the power detector adapted to generate a feedback signal based on the electrical signal output, the feedback signal being proportional to RLG beam power, and a stabilization circuit coupled to the power detector and the RLG, the stabilization circuit being adapted to alter the RLG beam power based on the feedback signal.

DRAWINGS

The present invention can be more easily understood and further advantages and uses thereof more readily apparent, when considered in view of the description of the preferred embodiments and the following figures in which FIG. 1 is a flowchart of a method for stabilizing a ring LASER gyroscope beam power during high vibration periods according to one embodiment of the present invention.

DETAILED DESCRIPTION

Figure 1:
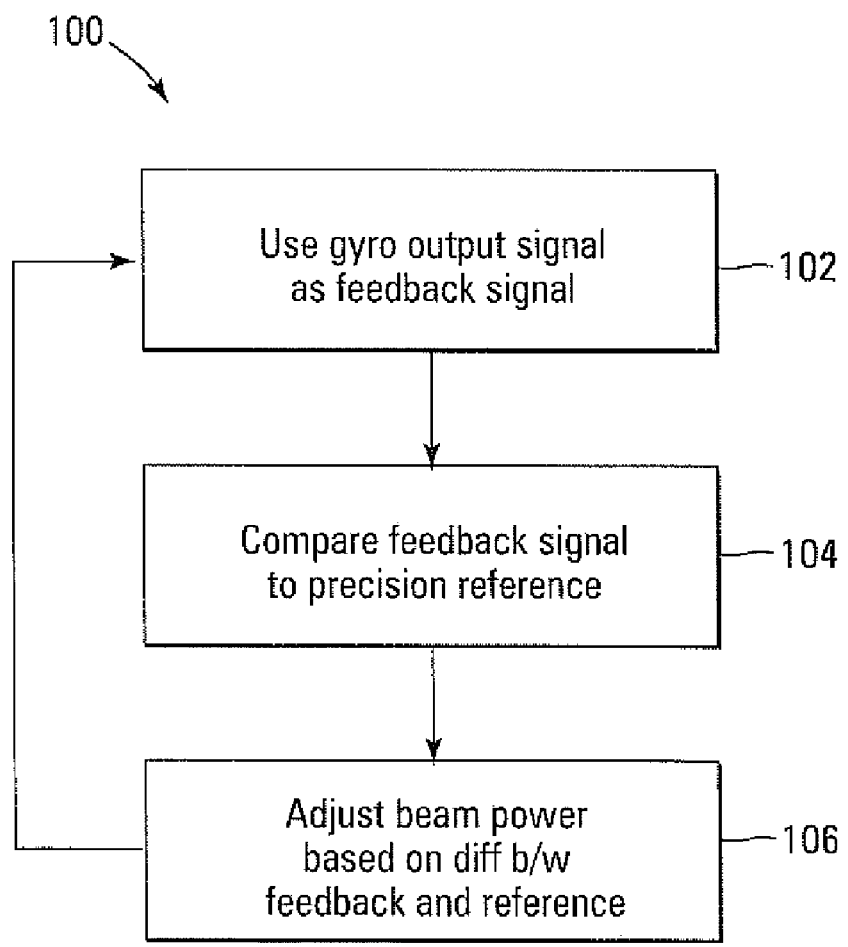

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. It should be understood that the exemplary method illustrated may include additional or fewer steps or may be performed in the context of a larger processing scheme. Furthermore, the methods presented in the drawing figures or the specification are not to be construed as limiting the order in which the individual steps may be performed. The following detailed description is, therefore, not to be taken in a limiting sense.

Embodiments of the present invention substantially stabilize beam power in a ring LASER gyroscope (RLG) by adjusting beam power based on analysis of an RLG output signal. Embodiments of the present invention enable selection of a given desired beam power intensity and maintenance of the beam power at approximately the given desired beam power. Therefore, even in the presence of high acceleration forces, such as during periods of high vibrations, embodiments of the present invention help eliminate noise caused by flexure of the RLG structure due to acceleration forces.

FIG. 1 is a flowchart of a method 100 for stabilizing a ring LASER gyroscope (RLG) beam power during high vibration periods according to one embodiment of the present invention. At 102, an RLG output signal is used as a feedback signal. A typical RLG outputs at least one of two signals: a first alternating current (AC) waveform which is proportional to RLG beam power by measuring peak to peak and a second signal whose current is directly proportional to beam power. In embodiments using the first AC signal, the feedback signal is generated by converting the output to a direct current (DC) signal whose DC level is proportional to the gyro readout signal amplitude (i.e. beam power). In some such embodiments, the feedback signal is generated by full wave rectifying the gyro readout signal followed by filtering the signal with a low-pass filter. Additionally, in some such embodiments, the low pass filter has a 5 KHz cut off frequency. In other such embodiments, other cut off frequencies are used. In other embodiments, other means known to one of skill in the art are used to generate the feedback signal. In embodiments using the second output signal, the signal is directly proportional and can be used directly as a feedback signal without requiring that a new feedback signal be generated. In some embodiments the feedback signal is modified such that the feedback signal bandwidth exceeds an expected maximum vibration exposure frequency.

At 104, the feedback signal is compared to a reference signal. The reference signal is also proportional to the normal or desired beam power of the RLG during normal conditions. Hence, under normal conditions, the feedback signal and the reference signal are substantially equal. In some embodiments, the DC level of the feedback signal is compared to the DC level of the reference signal. For example, as cavity misalignments occur due to high vibrations, the DC level of the generated feedback signal will change. This change is detected through comparison of the generated feedback signal with the reference signal. A difference signal representing the difference between the DC level of the generated feedback signal and the reference signal is used to drive an amplifier for adjusting the beam power at 106.

At 106, the RLG beam power is adjusted to substantially match the desired beam power output. The discharge current through the RLG is adjusted to increase and decrease the RLG beam power output as needed. In such embodiments, the derived difference signal drives an amplifier which amplifies current in a signal to the RLG. The current in the amplified signal is proportional to the desired increase or decrease in RLG beam power. Based on the current in the amplified signal to the RLG, the total discharge current is altered such that the beam power substantially matches the desired RLG beam power output. For example, a difference signal indicating that the feedback signal DC level is less than the reference signal causes an amplifier to increase the current through the RLG. As a result of the increased current through the RLG, the total discharge current, and subsequently beam power, of the RLG is increased.

The method then returns to 102 where a new RLG output signal is detected and used as a new feedback signal. For example, in embodiments using the first output signal, the output signal will have increased beam power due to adjustments at 106 and be converted to a new feedback signal with a new DC level. The new feedback signal is again compared to the reference signal at 104. If there is still a difference between the DC level of the reference signal and the DC level of the new feedback signal, a difference signal is generated to drive an amplifier for further correction of the total discharge current. Once the feedback signal and the reference signal are again substantially equal, the difference signal generated is approximately zero. Hence, the difference signal does not drive further changes in RLG beam power. In this manner the desired beam power of the RLG is maintained. The desired beam power is, therefore, determined by adjusting the reference signal. When the high vibrations decrease, the effects of cavity misalignment also decrease.

Figure 2:
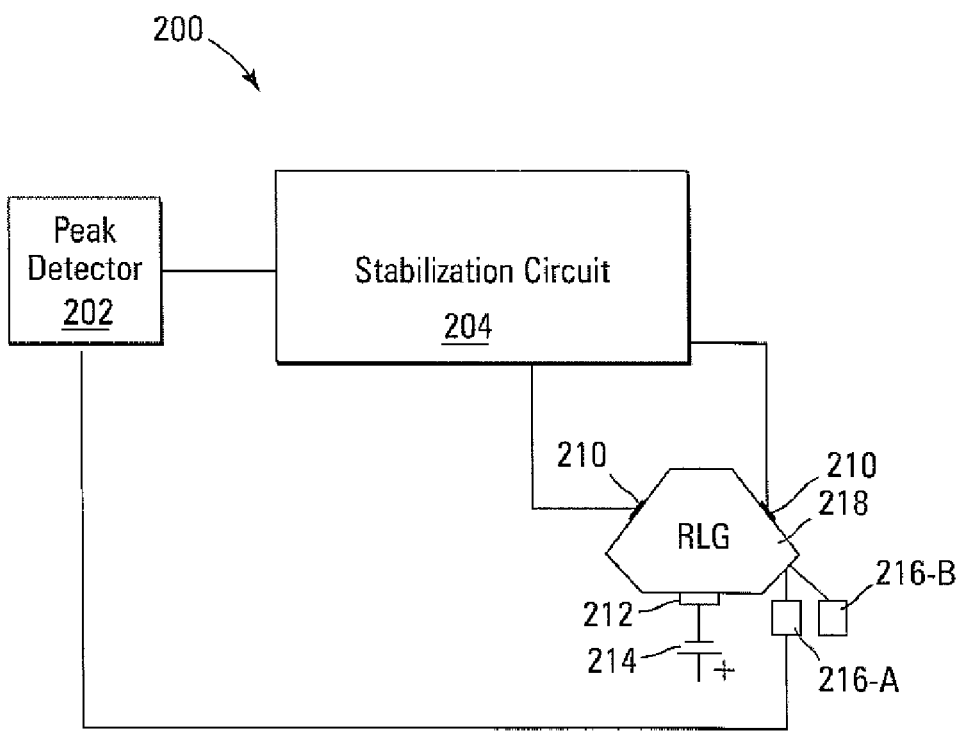
FIG. 2 is a circuit diagram of a self-stabilizing ring LASER gyroscope system according to one embodiment of the present invention.

FIG. 2 is a circuit diagram of a self-stabilizing ring LASER gyroscope (RLG) system 200 according to one embodiment of the present invention. In some embodiments, self-stabilizing RLG system 200 is implemented in an inertial reference system, such as a rate sensing system. Self-stabilizing RLG system 200 includes RLG 218, voltage source 214, and photodetectors 216-A and 216-B. RLG 218 uses a plurality of mirrors and lasers to detect changes in rotation. Voltage source 214 is coupled to cathode 212 of RLG 218. An RLG optical output is converted to an electrical signal by one of photodetector 216-A and photodector 216-B. Although, photodetectors 216-A and 216-B typically form part of RLG 218, photodetectors 216-A and 216-B are shown separately in FIG. 2 for purposes of explanation. Photodetector 216-A produces an electrical AC waveform based on the RLG optical output. The output of photodetector 216-A is proportional to beam power by measuring peak to peak. Photodector 216-B outputs an electrical signal whose current is directly proportional to RLG 218 beam power. An exemplary embodiment using the output of photodetector 216-B is described below in relation to FIG. 3.

As shown in FIG. 2, the electrical signal output of photodetector 216-A is received at peak detector 202. Peak detector 202 converts the output of photodetector 216-A to a DC feedback signal whose DC level is proportional to the RLG output signal's beam power.

Stabilization circuit 204 compares the DC level of the feedback signal from peak detector 202 with the DC level of a reference signal. Under normal conditions, the DC level of both signals will be substantially equal. However, under high vibration conditions, discharge cavity misalignment will cause the DC level of the feedback signal to change. Stabilization circuit 204 computes the difference between the two signals and generates a difference signal to drive changes in the RLG beam power. The difference signal is proportional to a desired correction in beam power. In some embodiments, as shown in FIG. 2, the difference signal generated by stabilization circuit 204 is coupled to anodes 210 of RLG 218 driving changes in the current through RLG 218. In other embodiments, the difference signal generated by stabilization circuit 204 is coupled to cathode 212 of RLG 218 driving changes in the discharge current through RLG 218. In yet other embodiments, a difference signal generated by stabilization circuit 204 is coupled to anodes 210 and cathode 212 driving changes in the discharge current through RLG 218.

Adjusting the current through RLG 218 alters the output beam power of RLG 218. Photodetector 216-A detects the change in beam power and a new electrical signal output of photodetector 216-A is received at peak detector 202. Peak detector 202 converts the new electrical signal to a DC feedback signal whose DC level is proportional to the new beam power. Stabilization circuit 204 compares the new feedback signal to the reference signal and generates a new difference signal representing the new difference between the reference signal and the new feedback signal. The new difference signal generated by stabilization circuit 204 is coupled to RLG 218 as described above and controls altering the beam power through changes in the discharge current through RLG 218. This process continues until the DC levels of the feedback signal and reference signal are substantially equal. During periods of high vibration when cavity misalignment lowers beam power, an output of stabilization circuit 204 amplifies the discharge current, thus amplifying beam power, until the DC levels of the feedback signal and the reference signal are substantially equal. As vibrations levels return to normal, an output of stabilization circuit 204 decreases amplification of the discharge current as the effects of cavity misalignment decrease such that the DC levels of the feedback signal and the reference signal are maintained substantially equal. Therefore, stabilization circuit 204 maintains beam power of RLG 218 substantially constant.

Figure 3:
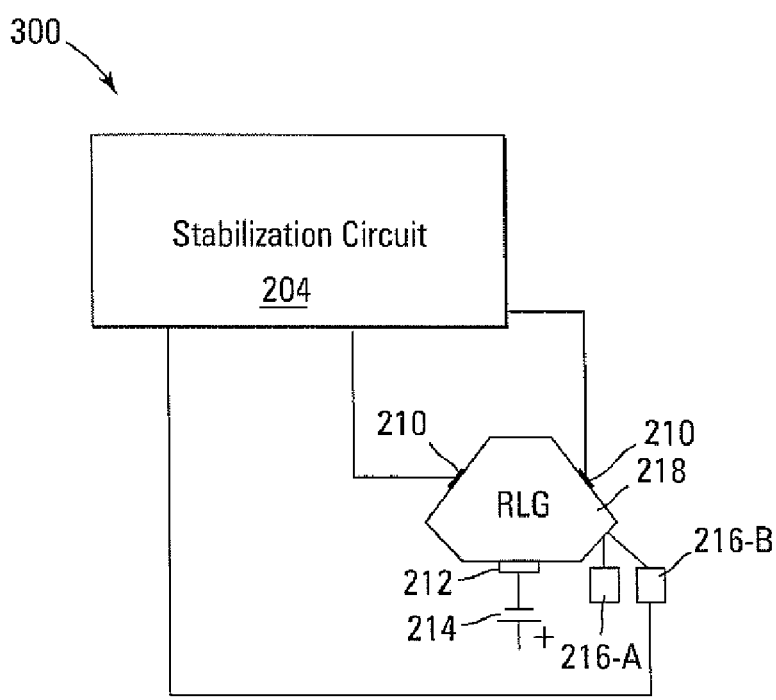
FIG. 3 is a circuit diagram of a self-stabilizing ring LASER gyroscope (RLG) system according to another embodiment of the present invention.

FIG. 3 is a circuit diagram of a self-stabilizing ring LASER gyroscope (RLG) system 300 according to another embodiment of the present invention. Self-stabilizing RLG system 300 also includes RLG 218, voltage source 214, and photodetectors 216-A and 216-B. In the embodiment in FIG. 3, an electrical output of photodetector 216-B is coupled directly to stabilization circuit 204. The current level of photodetector 216-B is directly proportional to RLG 218 beam power.

Stabilization circuit 204 compares the current level of the feedback signal from photodetector 216-B with the current level of a reference signal. Under normal conditions, the current levels of both signals will be substantially equal. However, under high vibration conditions, discharge cavity misalignment will cause the current level of the feedback signal to change. Stabilization circuit 204 computes the difference between the two signals and generates a difference signal to drive changes in RLG 218 beam power. The difference signal is proportional to a desired correction in beam power. In some embodiments, as shown in FIG. 3, the difference signal generated by stabilization circuit 204 is coupled to anodes 210 of RLG 218 driving changes in the current through RLG 218. In other embodiments, the difference signal generated by stabilization circuit 204 is coupled to cathode 212 of RLG 218 driving changes in the discharge current through RLG 218. In yet other embodiments, a difference signal generated by stabilization circuit 204 is coupled to anodes 210 and cathode 212 driving changes in the discharge current through RLG 218.

Adjusting the current through RLG 218 alters the output beam power of RLG 218. Photodetector 216-B detects the change in beam power and a new electrical signal output of photodetector 216-B is received by stabilization circuit 204. Stabilization circuit 204 compares the new feedback signal to the reference signal and generates a new difference signal representing the new difference between the reference signal and the new feedback signal. The new difference signal generated by stabilization circuit 204 is coupled to RLG 218 as described above and controls altering and stabilizing the beam power through changes in the discharge current through RLG 218. This process continues until the current levels of the feedback signal and reference signal are substantially equal. During periods of high vibration when cavity misalignment lowers beam power, an output of stabilization circuit 204 amplifies the discharge current, thus amplifying beam power, until the current levels of the feedback signal and the reference signal are substantially equal. As vibrations levels return to normal, an output of stabilization circuit 204 decreases amplification of the discharge current as the effects of cavity misalignment decrease such that the current levels of the feedback signal and the reference signal are maintained substantially equal. Therefore, stabilization circuit 204 maintains beam power of RLG 218 substantially constant.

Figure 4:
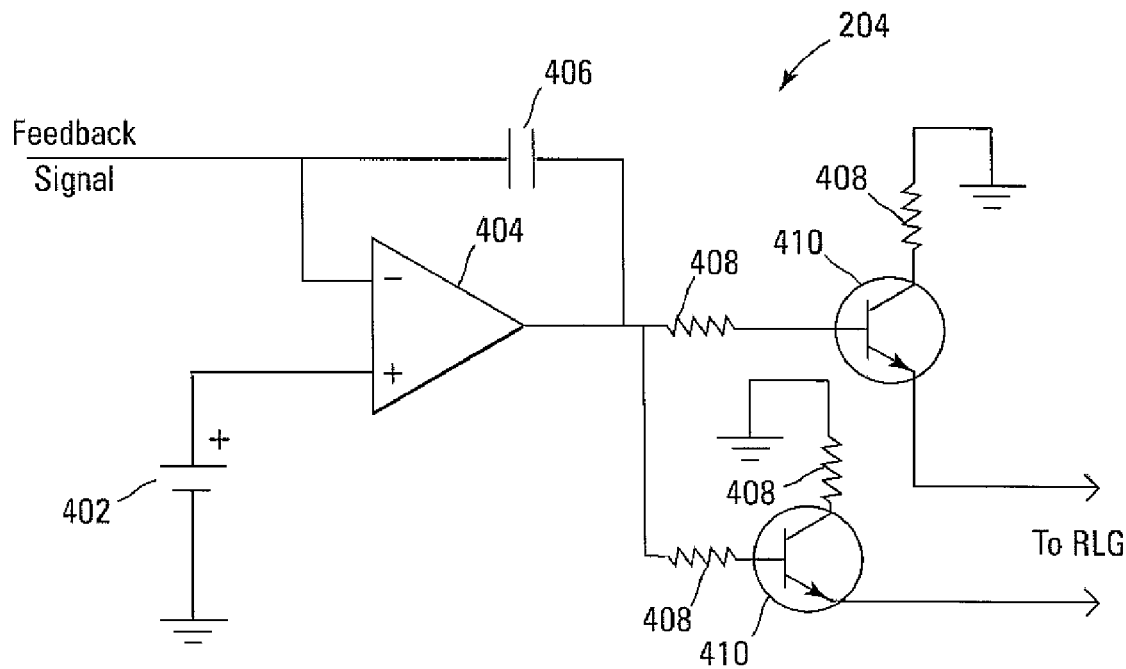
FIG. 4 is a circuit diagram of a stabilization circuit according to one embodiment of the present invention.

FIG. 4 is a circuit diagram of a stabilization circuit 204 according to one embodiment of the present invention. In the embodiment in FIG. 4, stabilization circuit 204 consists of operational amplifier 404, capacitor 406, bipolar transistors 410, source 402 and resistors 408. In other embodiments, other components known to one of skill in the art for comparing and generating signals are used. Furthermore, stabilization circuit 204 shown in FIG. 4 has two output signals which provide current to anodes 210 of RLG 218 in FIG. 2. However, it will be understood by one of skill in the art that modifications can be made to provide a signal to cathode 212 of RLG 218.

Capacitor 406 is used to provide negative feedback to op amp 404 in an ideal integrator configuration. Source 402 provides a reference signal whose DC level is proportional to the desired RLG output signal's beam power under normal conditions. The integrator created by op amp 404 and capacitor 406 amplifies the difference signal between the feedback signal and the reference signal from source 402. Transistors 410 in conjunction with resistors 408 act as series pass elements (i.e., variable resistors) in the discharge current path and are controlled by the output signal from op amp 404. In some embodiments, transistors 410 are implemented as at least one of bipolar transistors and field effect transistors. In other embodiments, other transistors are used. The amount of amplification and current control range are influenced by the values of resistors 408 and the characteristics of transistors 410. Methods of choosing appropriate values for resistors 408 and transistors 410 based on desired output and current control range are known to one of skill in the art and not discussed herein. In some embodiments an output of each of transistors 410 is coupled with an anode 210 of RLG 218, shown in FIG. 2, altering the discharge current through RLG 218 based on the output of transistors 410. In other embodiments, other means of comparing and amplifying a difference between the feedback signal and the reference signal are used.

Figure 5:
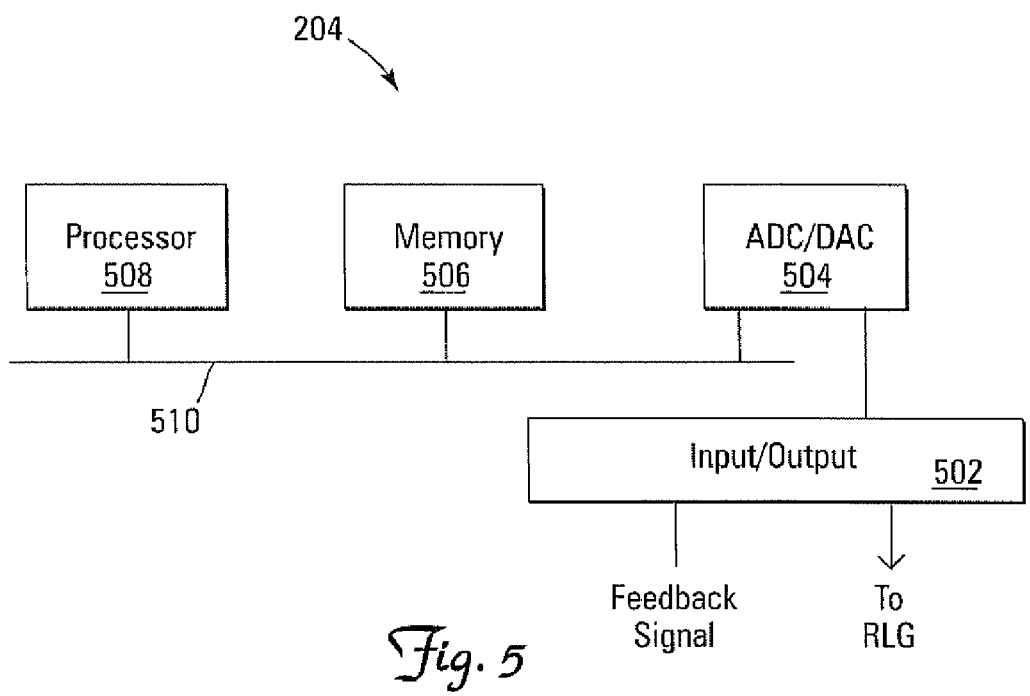
FIG. 5 is a block diagram of a stabilization circuit according to one embodiment of the present invention.

FIG. 5 is a block diagram of a stabilization circuit 204 according to one embodiment of the present invention. Stabilization circuit 204, in FIG. 5, includes input/output interface 502, analog-to-digital/digital-to-analog converter (ADC/DAC) 504, memory 506, processor 508, and bus 510. A feedback signal proportional to RLG 218 beam power is received at input/output interface 502. ADC/DAC 504 converts the received analog signal to a digital signal for processing by processor 508. Bus 510 couples together input/output interface 502, Processor 508, and Memory 506. In some embodiments, input/output interface 502 receives an AC electrical signal directly from photodetector 216. In such embodiments, processor 508 converts the signal from photodetector 216 to a DC signal proportional to RLG beam output power after digital conversion by ADC/DAC 504.

Processor 508 includes or interfaces with hardware components that support processing the output signal. By way of example and not by way of limitation, these hardware components include one or more microprocessors, graphics processors, memories, storage devices, interface cards, and other standard components known in the art. Additionally, processor 508 includes or functions with software programs, firmware or computer readable instructions for carrying out various methods, process tasks, calculations, and control functions. These instructions are typically stored on any appropriate medium used for storage of computer readable instructions such as floppy disks, conventional hard disks, CD-ROM, flash ROM, nonvolatile ROM, RAM, and other like medium. In some embodiments, the instructions are stored on Memory 506.

Processor 508 compares the received feedback signal to a reference value. Processor 508 further calculates a difference between the received signal and the reference value. In some embodiments, the difference is based on the difference in the DC level of the feedback signal and a reference value. Processor 508 then generates a correction signal for driving corrections in current through RLG 218 to stabilize beam power based on the calculated difference and sends the correction signal to input/output interface 502 over bus 510. ADC/DAC 504 coupled to input/output interface 502 converts the correction signal to an analog signal and input/output interface 502 outputs the correction signal to at least one of anodes 210 and cathode 212, shown in FIG. 2. The correction signal adjusts the discharge current through RLG 218, thereby adjusting and stabilizing beam power output.

During periods of high vibration, cavity misalignments in RLG 218 cause the beam power to drop. Processor 508 detects the drop through comparison of the photodetector output signal and the reference value. Based on the difference, processor 508 generates a difference signal which stabilizes the beam power in RLG 218 by driving corrections in the discharge current through RLG 218. When vibrations return to normal, the difference between the reference value and photodetector output changes. In accordance with the change, processor 508 alters the discharge current until the reference value and photodetector output are substantially equal. In some embodiments, stabilization circuit 204 is implemented in an application specific integrated circuit (ASIC).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of stabilizing beam power in a ring LASER gyroscope (RLG) during high vibration, the method comprising:

modifying an electrical signal output from an RLG photodetector such that the signal bandwidth of the modified electrical signal output exceeds an expected maximum vibration exposure frequency;

using the modified electrical signal output from the RLG photodetector as a feedback signal, the feedback signal being proportional to RLG beam power;

comparing the feedback signal to a reference signal, wherein the reference signal is proportional to a desired RLG beam power level;

generating a difference signal representing a difference between the reference signal and the feedback signal; and adjusting RLG beam power based on the difference signal.

2. The method of claim 1, wherein modifying the electrical signal output from the RLG photodetector further comprises:

full wave rectifying the electrical signal output from the photodetector coupled to the RLG; and filtering the rectified output signal with a low-pass filter.

3. The method of claim 1, wherein generating a difference signal Further comprises:

generating a difference signal which is proportional to a desired correction in beam power.

4. The method of claim 3, wherein adjusting RLG beam power based on the difference signal further comprises:

driving corrections in discharge current through the RLG with the difference signal.

5. The method of claim 4, further comprising:

setting a maximum allowable current in the RLG; and allowing the current through the RLG to run at the maximum allowable current during start of operation of the RLG.

6. A self-stabilizing ring LASER gyroscope (RLG), comprising:

a photodetector for detecting optical signals from the RLG and generating an electrical RLG output signal based on the optical signals detected, the electrical RLG output signal being proportional to RLG beam power; and a stabilization circuit coupled to the photodetector and RLG, the stabilization circuit being adapted to alter the RLG beam power based on the electrical RLG output signal, wherein the stabilization circuit is further adapted to utilize the electrical RLG output signal having a signal bandwidth that exceeds an expected maximum vibration exposure frequency.

7. The self-stabilizing ring LASER gyroscope of claim 6, wherein the stabilization circuit is further adapted to compare a feedback signal based on the electrical RLG output signal to a reference signal, to generate a difference signal based on a difference between the feedback signal and the reference signal, and to output the difference signal to the RLG.

8. The self-stabilizing ring LASER gyroscope of claim 6, wherein an output signal of the stabilization circuit drives corrections in current through the RLG to stabilize beam power to a desired level, the output of the stabilization circuit being coupled to one of anodes of the RLG and a cathode of the RLG.

9. The self-stabilizing ring LASER gyroscope of claim 6, wherein the stabilization circuit comprises:

an input/output interface for receiving an electrical feedback signal proportional to RLG beam power;

an analog-to-digital/digital-to-analog converter (ADC/DAC) coupled to the input/output interface for converting the electrical feedback signal to a digital feedback signal such that the digital feedback signal has a signal bandwidth that exceeds an expected maximum vibration exposure frequency; and a processor coupled to the input/output interface for comparing the digital feedback signal to a reference value and generating a digital difference signal based on the comparison of the digital feedback signal to the reference value, wherein the digital difference signal is converted to an analog signal by the ADC/DAC prior to transmission to the RLG through the input/output interface for adjusting RLG beam power to a desired level.

10. The self-stabilizing ring LASER gyroscope of claim 6, further comprising:

a peak detector coupled to the stabilization circuit and the photodetector for receiving the electrical RLG output signal generated by the photodetector and modifying the received electrical RLG output signal to produce a feedback signal based on the electrical RLG output signal, wherein the feedback signal is proportional to RLG beam power.

11. The self-stabilizing ring LASER gyroscope of claim 10, wherein:

the peak detector rectifies and filters the received electrical RLG output signal to produce a direct current (DC) feedback signal whose DC levels are proportional to RLG beam power; and the stabilization circuit compares the DC levels of the feedback signal to the DC level of a reference signal, wherein the reference signal DC level is proportional to a desired RLG beam power.

12. The self-stabilizing ring LASER gyroscope of claim 6, wherein the stabilization circuit comprises:

an integrator for amplifying a difference signal for the difference between a feedback signal based on the electrical RLG output signal and a reference signal;

a plurality of resistors coupled to the integrator; and a plurality of transistors coupled to the resistors and integrator, each transistor further coupled to the RLG, wherein the transistors in conjunction with the resistors amplify the current of the difference signal, the amplified output of the transistors adjusting the discharge current through the RLG.

13. The self-stabilizing ring LASER gyroscope of claim 12, wherein
the plurality of transistors further comprises at least one of a bipolar transistor and a field effect transistor.

14. A self-stabilizing ring LASER gyroscope (RLG), comprising:

means for generating a feedback signal the feedback signal being proportional to RLG beam power, the means for generating the feedback signal comprising means for modifying the feedback signal such that the signal bandwidth of the feedback signal exceeds an expected maximum vibration frequency;

means for comparing the feedback signal to a reference signal;

means for generating a difference signal representing the difference between the feedback signal and the reference signal, wherein the reference signal is proportional to a desired RLG beam power level; and means for adjusting RLG beam power based on the difference signal.

15. A computer readable medium having computer-executable instructions for performing a method of generating a signal to stabilize beam power output of a ring LASER gyroscope (RLG), the method comprising:

receiving a digital signal proportional to RLG beam power, the digital signal having a signal bandwidth that exceeds an expected maximum vibration exposure frequency;

calculating a difference in between the digital signal and a reference value, the reference value being proportional to a desired RLG beam power;

generating a correction signal for driving changes in RLG beam power, the correction signal being based on the calculated difference;

outputting the correction signal to a digital to analog converter to convert the correction signal to an analog signal for transmission to the RLG.

16. An inertial reference system, comprising:

a ring LASER gyroscope (RLG) having a plurality of mirrors, LASERs and at least one photodetector for receiving an optical signal from the LASERs and outputting an RLG electrical signal proportional to RLG beam power; and a stabilization circuit coupled to the RLG, the stabilization circuit being adapted to alter the RLG beam power based on the RLG electrical signal, wherein the stabilization circuit is further adapted to utilize the electrical RLG output signal having a signal bandwidth that exceeds an expected maximum vibration exposure frequency.

17. The inertial reference system of claim 16, wherein the stabilization circuit is further adapted to compare a feedback signal based on the RLG electrical signal to a reference signal, to generate a difference signal based on a difference between the feedback signal and the reference signal, and to output the difference signal to the RLG.

18. The inertial reference system of claim 16, wherein an output signal of the stabilization circuit drives corrections in current through the RLG to stabilize beam power to a desired level, the output signal being coupled to one of anodes of the RLG and a cathode of the RLG.

19. The inertial reference system of claim 16, further comprising:

a peak detector coupled to the RLG, the peak detector adapted to generate a feedback signal based on the RLG electrical signal, the feedback signal being proportional to RLG beam power.

20. The inertial reference system of claim 19, wherein:

the peak detector generates a direct current (DC) feedback signal whose DC levels are proportional to RLG beam power; and the stabilization circuit compares the DC levels of the feedback signal to the DC level of a reference signal, wherein the reference signal DC level is proportional to a desired RLG beam power.

21. The inertial reference system of claim 17, wherein an output signal of the stabilization circuit is coupled to anodes of the RLG driving corrections in current through the RLG to stabilize beam power to a desired level.

* * * * *